Jan. 24, 1939.　　　G. W. FOSTER　　　2,145,007

PLOW HITCH

Filed March 15, 1937　　　3 Sheets-Sheet 1

George W. Foster, INVENTOR

BY Victor J. Evans & Co.

ATTORNEYS

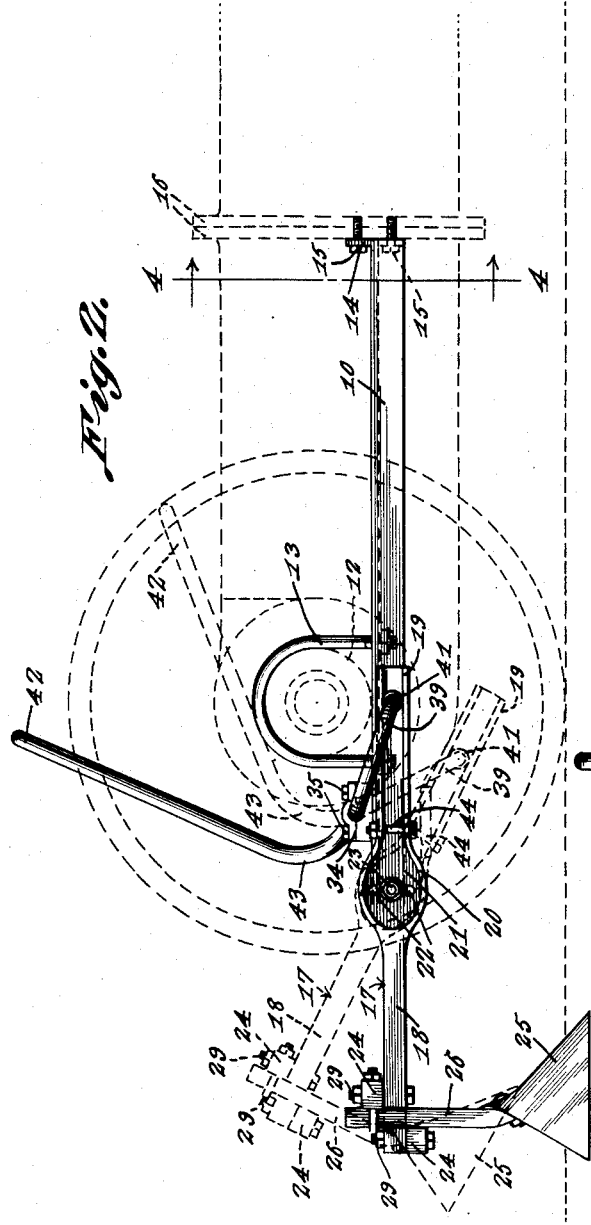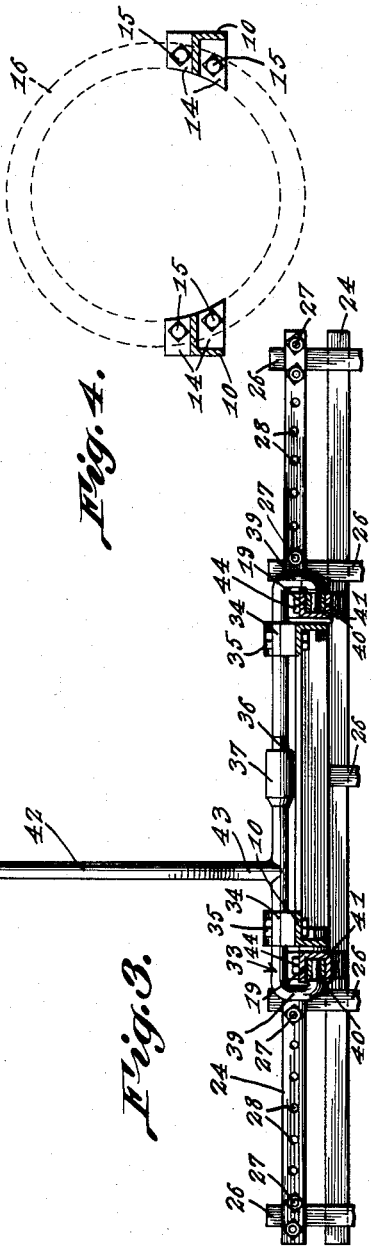

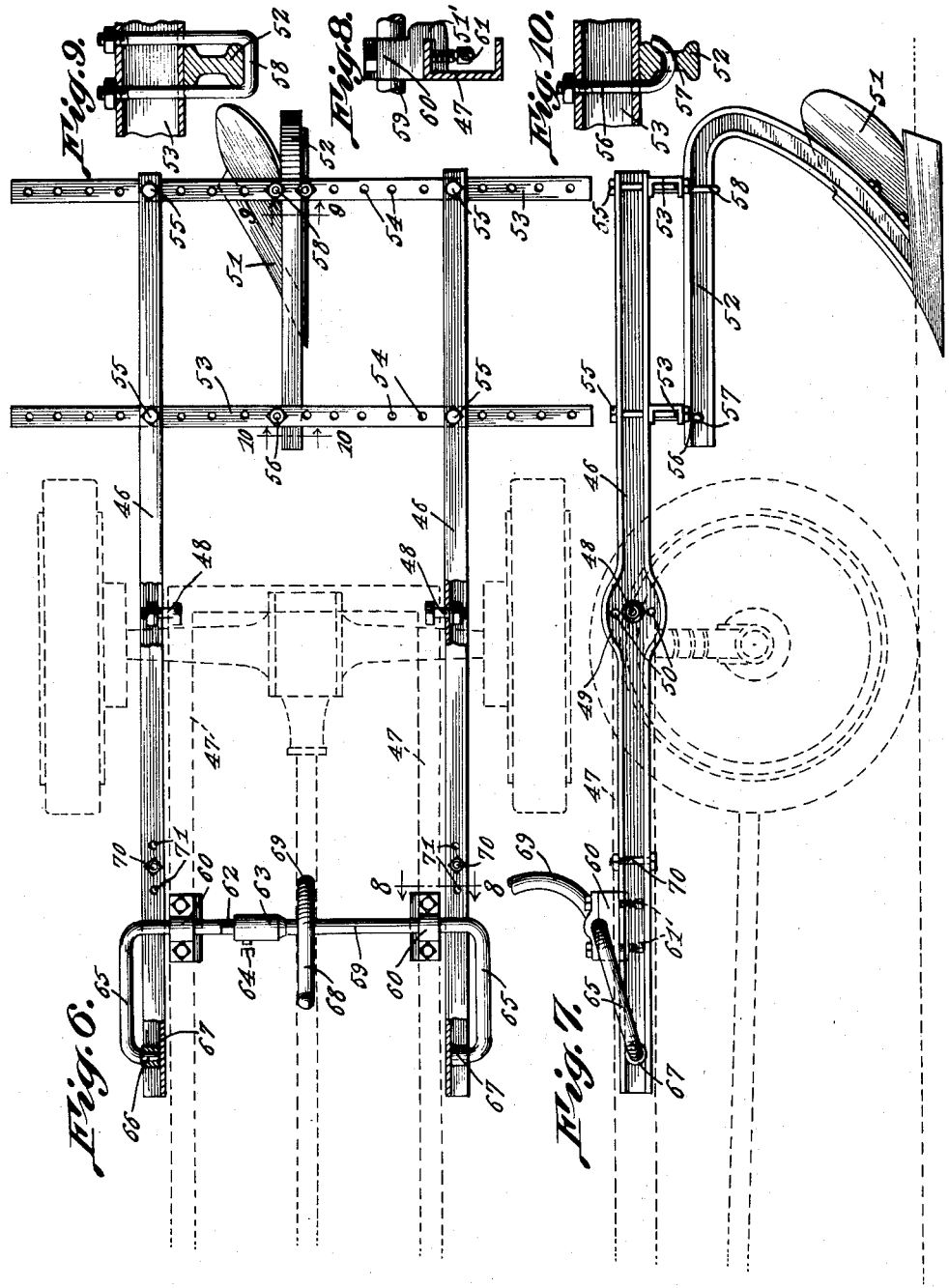

Patented Jan. 24, 1939

2,145,007

UNITED STATES PATENT OFFICE 2,145,007

PLOW HITCH

George W. Foster, Houston, Tex.

Application March 15, 1937, Serial No. 131,053

6 Claims. (Cl. 97—47)

This invention relates to plow hitches and has for an object to provide an adjustable plow hitch which may be attached to tractors, trucks, or cars of various widths, in minimum time and with minimum labor.

A further object is to provide a hitch which will promote quicker operation than usual when lifting the plow over stones, stumps, or other obstacles.

A further object is to provide a hitch having a novel operating lever and crank shaft adapted to hold the plow at the desired depth.

A further object is to provide a device of this character which will be formed of a few strong simple and durable parts, which will be easy to manufacture, and which will not easily get out of order.

With the above and other objects in view the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawings forming part of this specification,

Figure 1 is a plan view of a plow hitch constructed in accordance with the invention and shown applied to a conventional tractor.

Figure 2 is a side elevation of the parts shown in Figure 1.

Figure 3 is a front elevation of the parts shown in Figure 1 with parts broken away and parts shown in section.

Figure 4 is a detail cross sectional view taken on the line 4—4 of Figure 2.

Figure 5 is a detail perspective view of one of the draft beams.

Figure 6 is a plan view of a modified form of the invention.

Figure 7 is a side elevation of the parts shown in Figure 6.

Figure 8 is a detail cross sectional view taken on the line 8—8 of Figure 6.

Figure 9 is a detail cross sectional view taken on the line 9—9 of Figure 6.

Figure 10 is a detail cross sectional view taken on the line 10—10 of Figure 6.

Referring now to the drawings in which like characters of reference designate similar parts in the various views, 10 designates angle side bars which are connected at the rear ends by an angle cross bar 11, the side bars and cross bar forming a U-shaped frame which may be suspended beneath the axle housing 12 of a conventional tractor by means of U-bolts 13 which straddle the housing and are terminally secured at the ends to the flanges of the angle side bars 10. The forward ends of the side bars terminate in plates 14 each of which is bolted, as shown at 15 in Figure 4, to the usual body flanges 16 of the tractor. Thus the frame is rigidly secured to the tractor underneath the axial housing.

A pair of draft beams 17 are pivotally mounted at the rear ends of the side bars 10, each beam, as best shown in Figure 5, comprising a solid shank 18 and a channel extension 19 in alignment therewith. The channel extension at its juncture with the shank, is deformed to provide a substantially oval housing 20 in the web 21 of which three superposed openings 22 are formed to selectively receive the pivot bolt 23 which secures the beam to the frame. By passing the bolt selectively through the openings the depth of the furrows made by the plows will be regulated.

A pair of cross bars 24 of substantially rectangular cross section support plows 25 upon the rear ends of the draft beams 17. One of the cross bars is bolted to the top faces of the shanks 18 of the draft beams and the other cross bar is bolted to the bottom faces of the shanks of the draft beams. Both cross bars are spaced apart sufficiently to receive between them the plow posts 26, as best shown in Figures 1 and 2. The posts are secured to the upper cross bar 24 by U-bolts 27. As many plows as desired may be thus secured to the cross bars, the present embodiment of the invention showing a gang of 5 plows.

The distance apart of the plows may be adjusted as desired, and for this purpose, as best shown in Figure 4, a series of openings 28 are formed in the upper cross bar 24 and extend from the front face to the rear face of the cross bar to selectively receive the U-bolts 27. The cross bars 24 are secured to the draft beams 17 by means of bolts 29. A plurality of openings 30 are formed in the cross bars and extend from the top faces to the bottom faces of both cross bars to selectively receive the bolts 29 so that the draft beams may be adjusted toward or away from each other to attach them to tractors of different widths. Washers 31 on the pivot bolts 23 may be transferred from the inside to the outside of the webs of the side bars 10 to permit of the relative lateral adjustment of the draft beams just described. Vertical openings 32 are formed in the shanks of the draft beams to selectively receive the bolts 29 and permit of the plows being adjusted toward or away from the tractor.

For raising the plows to pass over stumps, stones, or other obstructions, a crank shaft 33 is pivotally mounted in bearings 34 which are bolted, as shown at 35, to the flanges of the side bars 10 near the cross bar 11. The crank shaft is preferably formed of two aligned sections, one having a squared end 36 which is received in a similarly shaped socket 37 in the other member. A set screw 38 is threaded through the socket and bears against the squared end 36 to hold the sections of the crank shaft in set position to adapt the length of the crank shaft to tractors of various widths. The crank shaft is provided at the ends with downwardly and forwardly inclined cranks 39 which terminate in spindles 40 which are equipped with rollers 41 that ride in the channel extensions 19 of the draft beams, as best shown in Figure 3.

The control lever 42 is provided with an arcuate lower end 43 which is spot welded or otherwise rigidly secured to the crank shaft 33. The arcuate lower end of the lever is adapted to curve backwardly and upwardly so that when the lever is rocked from the full line position to the dotted line position shown in Figure 2, the weight of the lever serves to hold the draft beams rocked to inoperative position to hold the plows in disengaged position without the use of a dog and notch segment or any other locking device. Thus the lever may be quickly shoved forwardly from the driver's seat to lift the plows or rocked rearwardly to lower the plows and when in either position will remain in this position due to the weight of the lever being forward beyond the crank shaft in one position and being rearward beyond the crank shaft in the other position. Thus fast work is promoted in manipulating the lever to engage or disengage the plows to avoid obstacles or to raise the plows when making turns or otherwise maneuvering.

It will be noted that the channels of the draft beams are open at the forward ends so that the draft beams may be disengaged from the frame by removal of the pivot bolts 23 without disturbing the crank shaft.

Stop bolts 44 are selectively engageable in a series of openings 45 formed in the flanges of the channel extensions of the draft beams. The rollers 41 of the cranks 39 engage these stop bolts and limit movement of the cranks in a direction to lift the rear ends of the draft beams. The stop bolts 44 may be adjusted forwardly or rearwardly in the openings 45 in accordance with whether the pivot bolts 23 are in the upper, intermediate, or lowermost of the openings 22, to control the depth of the furrows made by the plows.

In Figures 6 to 10 inclusive, a modified form of the invention is illustrated the same being adapted to be secured to the chassis of an automobile or truck. In this embodiment of the invention the draft beams 46 are pivoted substantially midway of their ends to the side rails 47 of the chassis through the instrumentality of pivot bolts 48. In this embodiment of the invention the draft beams are of channel metal and are each provided with a substantially oval enlargement 49 which forms a housing for the associated pivot bolt 48 and which is provided with superposed openings 50 adapted to adjustably receive the pivot bolt to vary the depth to which the plows may penetrate the earth.

The plows, one of which is shown at 51, may be of the conventional land side and mold board tye having associated therewith an I-beam 52 for attaching the plow share to the draft beam.

Two channel cross bars 53 are secured to the channel draft beams 46, and for this purpose the channel cross bars are provided with openings 54 which extend vertically through the channel cross bars and receive bolts 55 which are passed through the flanges of the channel cross bars. The openings 54 selectively receive the bolts 55 so that the draft beams may be adjusted toward or away from each other to fit various widths of truck bodies or chassis.

For securing the I-beam of each plow to the cross bars a J-bolt 56 is passed through the flanges of the front cross bar and through an opening 57 in the I-beam, as best shown in Figure 10, and a U-bolt 58 is passed through the flanges of the rear cross bar and embraces the I-beam 52, as best shown in Figure 9.

For rocking the draft beams 46 on the pivots 48 a crank shaft 59, similar to the above described crank shaft 33, is pivotally mounted in bearings 60 which are provided with hooks 61' that embrace the upper flanges of the channel side rails 47 of the chassis and are anchored thereto by means of set screws 61, as best shown in Figure 8.

The crank shaft is formed in two sections, one of which is provided with a squared end 62 which is received in a similarly shaped socket 63 in the other section and is secured therein by means of a set screw 64. The crank shaft terminates at the ends in cranks 65 which are provided with spindles 66 and are equipped with rollers 67 which ride in the channels of the draft beams 46.

The control lever 68 is provided with a curved lower end 69 which is spot welded or otherwise secured to the crank shaft and is, as previously described, adapted to be rocked forwardly or rearwardly to correspondingly raise or lower the plow and automatically maintain the plow in adjusted position by virtue of the weight of the lever being disposed respectively in front of or in rear of the crank shaft as previously explained.

A stop bolt 70 is passed through the flanges of each draft beam 46 and contacts with the associated roller 67 to limit throw of the control lever in a forward direction. The stop bolts are interchangeably received in openings 71 formed in the draft beams to limit throw of the operating lever when the depth of penetration of the plow is set by inserting the pivot bolts 48 of the draft beams in either the upper, intermediate, or the lowermost opening 50 as previously described.

From the above description it is thought that the construction and operation of the invention will be fully understood without further explanation.

What is claimed is:

1. A plow hitch comprising parallel draft beams swingable in vertical planes, a plow carried by the rear ends of the beams, a crank shaft having cranks operatively engaging the beams near the front ends thereof for swinging the beams to raise and lower the plow, and a control lever having an arcuate lower end fixed to the crank shaft and adapted to be rocked to either limit of its movement to hold the plow in operative or inoperative position.

2. A plow hitch comprising parallel draft beams swingable in vertical planes and having channels in the sides opening through the forward ends of the beams, a plow carried by the rear ends of the beams, a crank shaft having cranks slidably fitted in said channels and adapted to swing the beams to raise and lower the plow, the cranks being adapted to pass out through the open ends of the channels to permit the beams being disassembled from the crank shaft without disturbing the crank shaft, and a control lever fixed to the crank shaft.

3. A plow hitch comprising parallel draft beams swingable in vertical planes, a plow carried by the rear ends of the beams, means for pivotally mounting the beams upon a motor vehicle, there being channels extending longitudinally in the beams and expanded intermediate the ends to provide housings for said means, a crank shaft having cranks operatively engaged in the channels and adapted to swing the beams to raise and lower the plow, means in the channels for limiting throw of the cranks, and a control lever fixed to the crank shaft.

4. A plow hitch comprising frame bars, channel draft beams, pivot pins for mounting the beams upon the bars, there being enlargements in the channels of the beams housing the pivot pins and having superposed openings selectively receiving the pivot pins to permit the beams to be adjusted vertically relatively to the bars, a plow carried by the beams, a crank shaft having cranks operatively engaging the beams for swinging the beams, and a control lever fixed to the crank shaft.

5. A plow hitch comprising parallel frame bars, draft beams pivotally mounted on the frame bars, cross bars connecting the rear ends of the draft beams, there being openings in the cross bars, bolts passed through the draft beams and selectively received in the openings to permit the lateral adjustment of the draft beams to fit various widths of motor vehicles, a crank shaft formed of sections each terminating in a crank operatively connected to an associated draft beam for swinging the beam, an adjustable connection between the confronting ends of the shaft for permitting the shaft to be adjusted in length to compensate for lateral adjustment of the draft beams toward or away from each other, means pivotally connecting the crank shaft to the frame bars, and a control lever fixed to the crank shaft.

6. A plow hitch comprising frame bars, channeled draft beams pivotally mounted on the frame bars, cross bars connecting the rear ends of the beams and adjustably mounted for movement longitudinally and transversely of the draft beams, a plow carried by the cross bars, bearings on the frame bars, a crank shaft having alined sections journaled in said bearings, cranks on the ends of the crank shaft having spindles entering the channels of the channel beams, rollers on said spindles engaging the draft beams, and a control lever fixed to the crank shaft.

GEORGE W. FOSTER.